United States Patent
Zhu et al.

(10) Patent No.: US 10,826,583 B2
(45) Date of Patent: Nov. 3, 2020

(54) ADAPTIVE PRECODING IN A MIMO WIRELESS COMMUNICATION SYSTEM

(71) Applicants: Dengkui Zhu, Beijing (CN); Ping Liang, Newport Coast, CA (US)

(72) Inventors: Dengkui Zhu, Beijing (CN); Ping Liang, Newport Coast, CA (US)

(73) Assignee: RF DSP Inc., Irvine, CA (US)

( * ) Notice: Subject to any disclaimer, the term of this patent is extended or adjusted under 35 U.S.C. 154(b) by 0 days.

(21) Appl. No.: 15/715,122

(22) Filed: Sep. 25, 2017

(65) Prior Publication Data

US 2019/0097700 A1 Mar. 28, 2019

Related U.S. Application Data

(62) Division of application No. 15/102,014, filed as application No. PCT/US2014/071753 on Dec. 20, 2014, now Pat. No. 9,847,819.

(60) Provisional application No. 61/919,613, filed on Dec. 20, 2013.

(51) Int. Cl.
| | |
|---|---|
| *H04B 7/0456* | (2017.01) |
| *H04L 25/03* | (2006.01) |
| *H04B 7/0452* | (2017.01) |
| *H04L 1/00* | (2006.01) |
| *H04B 7/0417* | (2017.01) |
| *H04L 25/02* | (2006.01) |

(52) U.S. Cl.
CPC ......... *H04B 7/0482* (2013.01); *H04B 7/0417* (2013.01); *H04B 7/0452* (2013.01); *H04L 1/0003* (2013.01); *H04L 1/0009* (2013.01); *H04L 25/03343* (2013.01); *H04L 25/03974* (2013.01); *H04L 25/0224* (2013.01)

(58) Field of Classification Search
CPC .... H04B 7/024; H04B 7/0408; H04B 7/0417; H04B 7/0452; H04B 7/0482; H04B 7/0626; H04B 7/0632; H04B 7/0224; H04L 1/0003; H04L 1/0224; H04L 1/1812; H04L 25/0224; H04L 25/03974; H04L 25/03343; H04L 1/0009
See application file for complete search history.

(56) References Cited

U.S. PATENT DOCUMENTS

| | | | |
|---|---|---|---|
| 2011/0032839 A1* | 2/2011 | Chen | H04B 7/024 370/252 |
| 2011/0051636 A1* | 3/2011 | Van Nee | H04B 7/0452 370/310 |
| 2012/0014424 A1* | 1/2012 | Heath, Jr. | H04B 7/0626 375/224 |
| 2012/0113830 A1* | 5/2012 | Zhu | H04B 7/024 370/252 |
| 2013/0064276 A1* | 3/2013 | Kim | H04B 7/0417 375/219 |

(Continued)

*Primary Examiner* — George Eng
*Assistant Examiner* — Hung K Du
(74) *Attorney, Agent, or Firm* — Guosheng Wang; United States Research and Patent Firm

(57) ABSTRACT

This invention presents methods for estimating MU-MIMO channel information using SU-MIMO channel information to choose a modulation and channel coding appropriate for the quality of the MU-MIMO channels, for adaptively selecting MU-MIMO precoding methods based on estimations of a plural of UEs and for compensating hardware impairments in MU-MIMO precoding.

5 Claims, 3 Drawing Sheets

(56) References Cited

U.S. PATENT DOCUMENTS

| | | | | |
|---|---|---|---|---|
| 2013/0094380 A1* | 4/2013 | Taoka | ............... | H04B 7/0417 |
| | | | | 370/252 |
| 2013/0121342 A1* | 5/2013 | Kim | ................. | H04B 7/0408 |
| | | | | 370/436 |
| 2014/0247749 A1* | 9/2014 | Kim | ................ | H04B 7/024 |
| | | | | 370/252 |

* cited by examiner

ADAPTIVE PRECODING IN A MIMO WIRELESS COMMUNICATION SYSTEM

This application is a divisional application of U.S. application Ser. No. 15/102,014 filed on Jun. 6, 2016, which is a national stage application of PCT/US2014/071753 filed on Dec. 20, 2014, which claims the benefit of U.S. Provisional Application No. 61/919,613, filed on Dec. 20, 2013. These three prior applications are incorporated herein by reference in their entirety.

FIELD OF INVENTION

This invention relates generally to wireless communications, and in particular, to the mechanism for a Base Station (BS) to estimate channel quality information (CQI) and apply adaptive precoding according to system information, Channel State Information (CSI) and the error of its estimation for each User Equipment (UE) in a large-scale MIMO wireless communication system.

BACKGROUND

In a large-scale MIMO or massive MIMO system, the BS is equipped with dozens of or even hundreds of transmitting antennas. It has received enormous attention due to its ability for providing linear capacity growth without the need of increased power or bandwidth and is a key technique for the next generation wireless communication systems (e.g., beyond 4G, 5G). This advantage is realized by employing Multi-User MIMO (MU-MIMO) where the number of paired users is more than that of traditional systems. In this system, the BS selects users at each scheduling slot and transmits data to these users on the same time and frequency resource block. Precoding vectors are used to map the transmitting signals to the hundreds of transmitting antennas. In practical systems, when the channel quality of users is poor, a precoding matrix that matches the wireless channel can be applied to achieve the array gain such that it enhances the quality of the receive signals. One such precoding method is Conjugate Beamforming (CB). For CB precoding, the precoding vector of the kth user is $w_k^{CB} = c_k h_k^H$. When the channel quality is good, the multi-user interference is the major factor that affects the throughput of the system, hence a precoding vector that removes this interference is needed to enhance the system throughput. One such precoding method is Zero-Forcing (ZF). For ZF precoding, the precoding vector of the kth user is $w_k^{ZF} = p_k (I - \tilde{H}_k^H (\tilde{H}_k \tilde{H}_k^H)^{-1} \tilde{H}_k) h_k^H$, where $\tilde{H}_k$ is the multi-user interference channel of the kth user defined as $\tilde{H}_k = [h_1^T \ldots h_{k-1}^T h_{k+1}^T \ldots h_K^T]^T$. Moreover, because of system errors, e.g., limited feedback bandwidth or measurement errors, there always exist unavoidable CSI errors. As a result, it is a challenge for the BS to compare these two precoding methods and adaptively employ a preferred precoding method for the UEs.

SUMMARY

This invention provides a method for solving a fundamental problem in MU-MIMO, namely, how to estimate MU-MIMO CQI values for all UEs in a group when only single-user MIMO (SU-MIMO) CQI values of these UEs are available. This is important because MU-MIMO CQI values are needed to choose proper modulation and channel coding schemes. However, while SU-MIMO CQI may be determined from measurements using transmission of pilot or test signals, it is often impractical to directly determine MU-MIMO CQI from measurements using transmission of pilot or test signals. In the latter case, channel reciprocity in Time-Division Duplexing (TDD) channels does not help, and for both Frequency-Division Duplexing (FDD) and TDD channels, pilot or test signals must be transmitted by a BS using a MU-MIMO precoding to all UEs in the group, and the MU-MIMO CQI values need to be determined at each UE and fed back to the BS. In the embodiments of this invention, the MU-MIMO CQI can be estimated using the SU-MIMO CQI of the UEs in the group, thus significantly reducing the overhead needed for direct determination of MU-MIMO CQI from measurements, and making MU-MIMO more feasible. Once MU-MIMO CQI values are available, the proper modulation and channel coding can be selected and the sum rate of MU-MIMO using the chosen MU-MIMO precoding can be estimated.

This invention provides an adaptive precoding method using the above MU-MIMO CQI estimation method and applies adaptive precoding for the users in a MU-MIMO user group. In this method, the BS collects system information, such as the number of transmitting antennas in the downlink, the number of UEs in a MU-MIMO user group, and information about each UE, such as Channel Quality Information (CQI) and the errors in the estimation of the CSI, referred to as CSI error. With this information, the BS could estimate the sum rate of one or more precoding methods, e.g., CB and ZF, respectively, and choose the precoding matrix with the larger sum rate.

Hardware impairment, especially in UE, is a limiting factor in the performance of MU-MIMO system. The invention also provides a method for characterizing hardware impairments and using the data from the characterization to modify the precoding to compensate for the hardware impairments.

DETAILED DESCRIPTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block represents a method step or an apparatus element for performing the method step. Depending upon the implementation, the corresponding apparatus element may be configured in hardware, software, firmware or combinations thereof.

In the considered wireless communication system, the BS has N transmitting antennas in the downlink, while without loss of generality each UE has one receiving antenna. It is straightforward to generalize to UEs with more than one receiving antenna.

Figure 1:
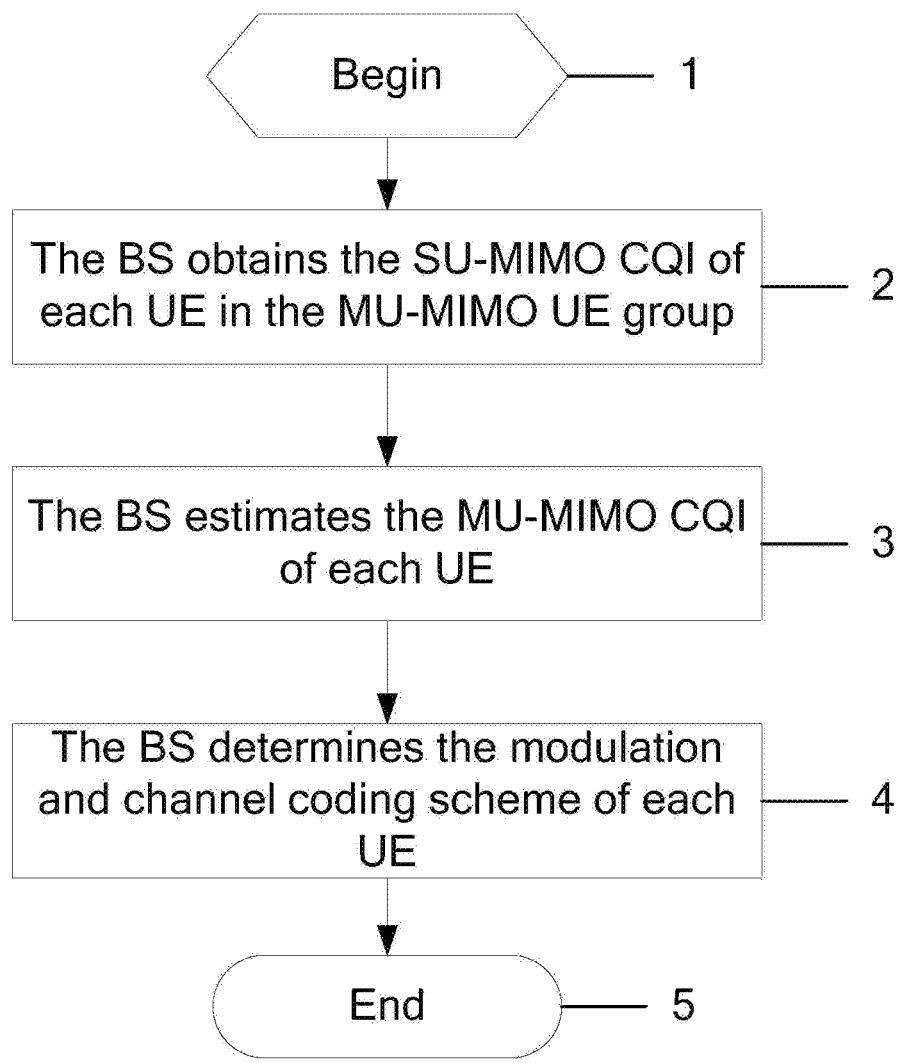
FIG. 1 is a flowchart of an embodiment for estimating MU-MIMO CQI from SU-MIMO CQI.

Without loss of generality, we assume that the BS has selected UEs to be included in a MU-MIMO group, which means that the indices of the K UEs that may be scheduled on the same resource allocation are determined. Then, the BS begins the process of the estimation of MU-MIMO CQI from SU-MIMO CQI 1 which is presented in FIG. 1. First, the BS obtains the SU-MIMO CQI of each UE in the MU-MIMO UE group 2. Then, the BS estimates the MU-MIMO CQI of each UE 3. With the estimation of MU-MIMO CQI of each UE, the BS then determines the modulation and channel coding scheme of each UE 4. After it, the process ends 5. The embodiments may be carried out for each resource block, which is defined as several subcarriers in frequency domain or several Orthogonal Frequency-Division Multiplexing (OFDM) symbols in the time domain.

One embodiment is a method for estimating MU-MIMO CQI values 3 comprising a BS obtaining SU-MIMO CQI values of a plural of UEs 2, which can be either by UEs transmitting test or pilot signals to the BS in case of reciprocal channels or BS transmitting test or pilot signals to the UEs and UEs feeding back their CQI values to the BS in case of non-reciprocal channels. Then, the BS estimates the MU-MIMO CQI values for the plural of UEs using the SU-MIMO CQI values. Formulas that can provide MU-MIMO CQI values for a plural of UEs using the SU-MIMO CQI values are listed below.

The MU-MIMO CQI estimation formula depends on the selected precoding method, which includes at least CB and/or ZF. For example, the formula for CB is $$SINR_k^{CB} = \frac{\alpha_k^2 N}{K + KN\gamma_k - 1} \text{ or}$$

$$SINR_k^{CB} = \frac{\alpha_k^2}{\sum_{\substack{j=1 \\ j \neq k}}^{K} |u_k u_j^H|^2 + K\gamma_k},$$

and the formula for ZF is $$SINR_k^{ZF} = \left(\frac{\alpha_k^2(N-K+1)}{(1-\alpha_k^2 - K\gamma_k)(K-1) + KN\gamma_k}\right) \text{ or}$$

$$SINR_k^{ZF} = \frac{\alpha_k^2 \left(1 - \sum_{\substack{j=1 \\ j \neq k}}^{K} |u_k u_j^H|^2\right)^2}{(1-\alpha_k^2 - K\gamma) \sum_{\substack{j=1 \\ j \neq k}}^{K} |u_k u_j^H|^2 + K\gamma_k}, \text{ or}$$

$$SINR_k = \frac{1 - u_k \tilde{H}_k^H \tilde{H}_k u_k^H}{K\gamma_k}, k = 1, \ldots, K,$$

where $1/\gamma_k$ is the reciprocal of the CQI of the kth UE, $u_k$ is the normalized channel coefficient vector of the kth user (If $u_k$ is not a unit norm, replace it with $$\frac{u_k}{\|u_k\|_2});$$

the mutual interference channel of the kth UE is $\tilde{H}_k = [u_k^T \ldots u_{k-1}^T u_{k+1}^T \ldots u_k^T]^T$, and $a_k$ is the CSI error of the kth UE. The method to acquire $a_k$ by the BS is described in [0028]-[0032].

Furthermore, once estimates of the MU-MIMO CQI values are obtained, the BS chooses a modulation and channel coding appropriate for the quality of the MU-MIMO channels 4. The BS may also choose a precoding that increases the sum rate of the plural of UEs.

Figure 2:
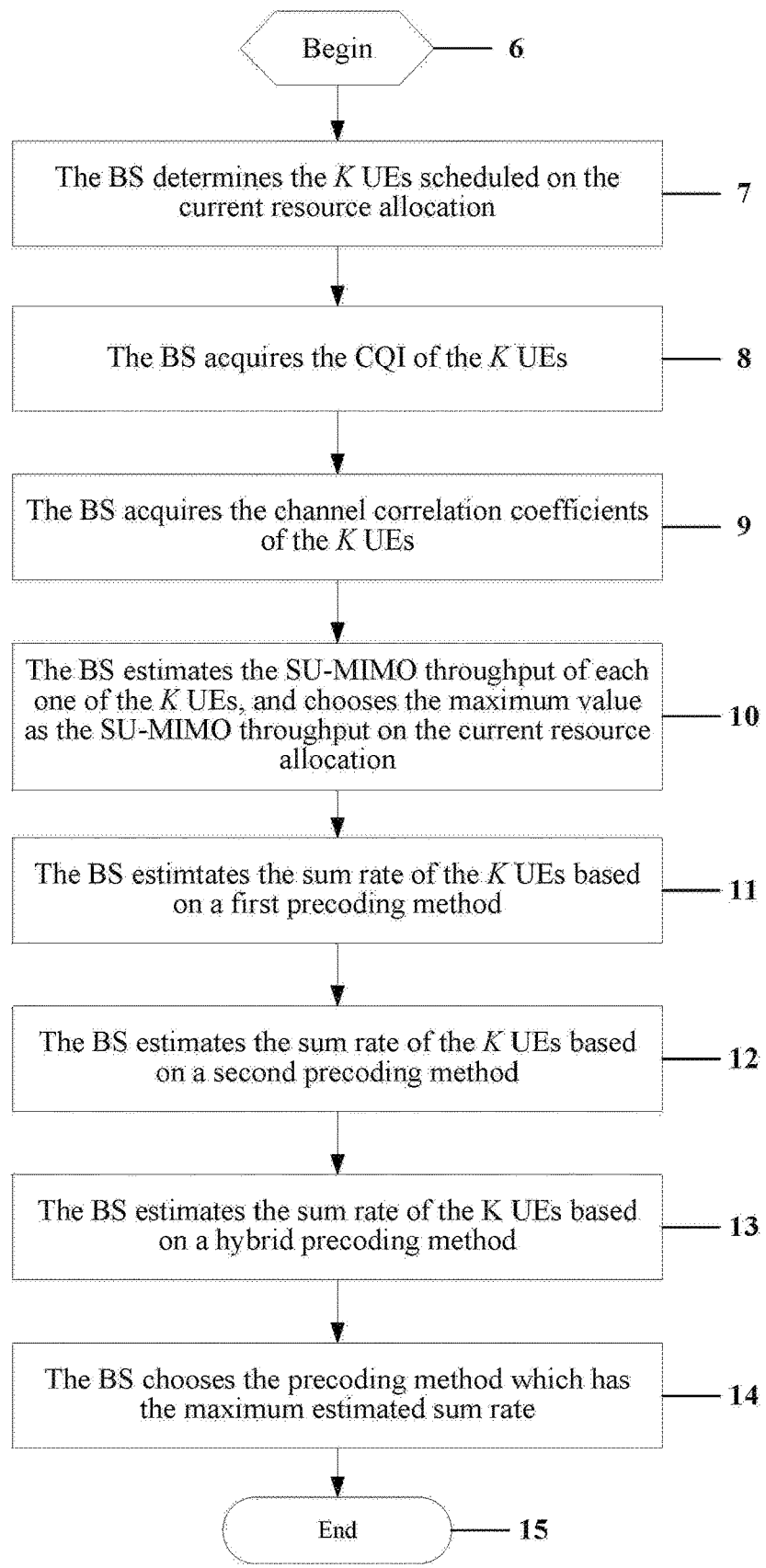
FIG. 2 is an illustration of the operation process of adaptive precoding in a BS.

Another embodiment is a method for adaptive precoding using the above MU-MIMO CQI estimation, which is presented in FIG. 2. After the process starts 6, the BS first determines the K UEs scheduled on the current resource allocation 7. Next, the BS acquires the CQI values of the K UEs 8. Based on these CQI values, the BS then acquires the channel correlation coefficients of the K UEs 9. Then, the BS estimates the SU-MIMO throughput of each one of the K UEs and chooses the maximum values as the SU-MIMO throughput on the current resource allocation 10. Next, the BS estimates the sum rate of the K UEs based on a first precoding method 11. Then, the BS estimates the sum rate of the K UEs based on a second precoding method 12. Next, the BS estimates the sum rate of the K UEs based on a hybrid precoding method 13. With these estimates, the BS then chooses the precoding method which has the maximum estimated values 14. After it, the process ends 15. In this embodiment, the BS obtains the CQI values of the K UEs 8, which are represented as $1/\gamma_k$, k=1, . . . , K. These values may be fed back to the BS by UEs through the uplink control channel, or by estimation in the uplink transmission using channel reciprocity.

When the BS estimates the throughput of each of the K UEs 10, one method is to calculate $$C_k^{SU} = \log\left(1 + \frac{1}{\gamma_k}\right), k = 1, \ldots, K,$$

and choose the maximum of these K values as $C^{SU}$.

The BS may estimate the sum rate of the MU-MIMO user group based on a first precoding 11, e.g., CB. Methods of this calculation are listed below.

CB-1: the BS estimates the sum rate of CB as $$C^{CB} = \sum_{i=1}^{K} \log\left(\frac{\alpha_k^2 N}{K + KN\gamma_k - 1}\right).$$

CB-2: the BS acquires the normalized channel coefficient vector of the kth user as $u_k$. If $u_k$ is not a unit norm, replace it with $$\frac{u_k}{\|u_k\|_2}.$$

Then, the BS estimates the sum rate of CB as $$C^{CB} = \sum_{k=1}^{K} \log \frac{\alpha_k^2}{\sum_{\substack{j=1 \\ j \neq k}}^{K} |u_k u_j^H|^2 + K\gamma_k}.$$

The BS may estimate the sum rate of the MU-MIMO user group based on a second precoding 12, e.g., ZF. Methods of this calculation are listed below.

ZF-1: the BS estimates the sum rate of the ZF precoding method according to $$C^{ZF} = \sum_{k=1}^{K_1} \log\left(\frac{\alpha_k^2(N-K+1)}{(1-\alpha_k^2-K\gamma_k)(K-1)+NK\gamma_k}\right).$$

ZF-2: the BS acquires the normalized channel coefficient vector of the kth user as $u_k$. If $u_k$ is not a unit norm, replace it with $$\frac{u_k}{\|u_k\|_2}.$$

Then, the BS estimates the sum rate of ZF as $$C^{ZF} = \sum_{k=1}^{K_1} \log \frac{\alpha_k^2\left(1 - \sum_{\substack{j=1 \\ j \neq k}}^{K} |u_k u_j^H|^2\right)^2}{(1-\alpha_k^2-K\gamma)\sum_{\substack{j=1 \\ j \neq k}}^{K} |u_k u_j^H|^2 + K\gamma_k}.$$

Furthermore, the BS may divide the K UEs into two sets. The first set $\Omega_1$ includes $K_1$ UEs with a first precoding, e.g., CB, while the second set $\Omega_2$ includes the remaining $K_2=K-K_1$ UEs with a second precoding. One possible method to divide the UEs is based on the SU-MIMO CQI, e.g., the UEs with SU-MIMO CQI values lower than a predefined threshold value belong to $\Omega_1$ and the rest of the UEs belong to $\Omega_2$. Suppose that the UE indices of $\Omega_1$ are $\{i_1, \ldots, i_{K_1}\}$ and the UE indices of $\Omega_2$ are $\{j_1, \ldots, j_{K_2}\}$.

The BS estimates the sum rate of the UEs in set $\Omega_1$ as $$C^{CB,\Omega_1} = \sum_{k=1}^{K_1} \log\left(\frac{\alpha_{i_k}^2 N}{K + KN\gamma_{i_k} - 1}\right) \text{ or}$$

$$C^{CB,\Omega_1} = \sum_{k=1}^{K_1} \log \frac{\alpha_{i_k}^2}{\sum_{\substack{l=1 \\ l \neq i_k}}^{K} |u_{i_k} u_l^H|^2 + K\gamma_{i_k}}.$$

The BS estimates the sum rate of the UEs in set $\Omega_2$ as $$C^{ZF,\Omega_2} = \sum_{k=1}^{K_2} \log\left(\frac{\alpha_{j_k}^2(N-K_2+1)}{(1-\alpha_{j_k}^2-K_2\gamma_{j_k})(K_2-1)+(K_1-1)+NK\gamma_{j_k}}\right) \text{ or}$$

$$C^{ZF,\Omega_2} = \sum_{k=1}^{K_2} \log \frac{\alpha_{j_k}^2\left(1 - \sum_{\substack{l=1 \\ l \neq j_k}}^{K_2} |u_{j_k} u_l^H|^2\right)^2}{(1-\alpha_{j_k}^2 - K_2\gamma_{j_k})\sum_{\substack{l=1 \\ l \neq j_k}}^{K_2} |u_{j_k} u_l^H|^2 + \sum_{i \in \Omega_1} |u_{j_k} u_i^H|^2 + K\gamma_{j_k}}.$$

The BS estimates the sum rate of the K UEs based on the hybrid precoding 13 as $C^{Hybrid}=C^{CB,\Omega_1}+C^{ZF,\Omega_1}$. After the BS obtains the values of $C^{SU}$, $C^{CB}$, $C^{ZF}$, and $C^{Hybrid}$, it compares these four values and chooses the precoding method which has the maximum or close to maximum estimated sum rate 14.

Once the adaptive precoding is completed on each resource block for the current time instant 15, each resource block may have a different precoding method in the next time instant.

In the formulas presented above, it is assumed that the BS acquires the CSI errors of the K users. Three methods are presented below for the BS to acquire the CSI errors.

In the first method referred to as FDD-1 for a FDD system where the CSI is fed back by UEs, each UE calculates its correlation coefficient and feeds it back to the BS through the uplink control channel. At the UE side, it estimates the channel vector $\hat{h}_k$ (represented as a column vector) between the BS and itself. Then, it quantizes $\hat{h}_k$ as $v_k$ (also a column vector) in a codebook set which is stored in the UE's memory. The correlation coefficient could be calculated as $$\alpha_k = \frac{|\hat{h}_k^H v_k|}{\|\hat{h}_k\|_2},$$

where $\|x\|_2$ denotes the 2-norm defined as $$\|x\|_2 = \sqrt{\sum_{i=1}^n |x_i|^2}.$$

Then, $\alpha_k$ is quantized and fed back to the BS through uplink control channel or shared data transmission channel.

In the second method referred to as FDD-2 for an FDD system where the CSI is fed back by UEs, the CSI errors of all UEs are estimated as the same value as $$\alpha = \alpha_k = \sqrt{1 - \left(\frac{d}{2}\right)^2},$$

where d is the average distance between any two vectors in the codebook set. If the codebook includes M vectors, then M could be calculated as $$d = \frac{\sum_{i<j} \sqrt{1 - |v_i^H v_j|^2}}{M(M-1)},$$

where $v_i$ and $v_j$ are two different vectors in a codebook set. An alternative estimation is $$\alpha = \beta\sqrt{1-\left(\frac{d_{max}}{2}\right)^2},$$

where $0<\beta<1$ is a scaling factor which may be determined by the BS itself, and $d_{max}$ is the maximum distance between any two vectors in the codebook set.

The third method referred to as TDD-1 is for a TDD system where the downlink CSI is acquired by the BS employing the channel reciprocity of the uplink transmission. Let the uplink channel quality of the kth user be $SNR_k^{UL}$, then one possible way to estimate the channel coefficient is $$\alpha_k = \sqrt{\frac{SNR_k^{UL}}{SNR_k^{UL}+g}},$$

where the parameter g is a function of the number of the transmitting antennas of BS, e.g., g=N.

Furthermore, $\alpha_k$ may be modified by the BS according to the Hardware Impairment Parameters (HIP) and the Current Temperatures (CT) of the UE to compensate for the effects caused by impairments of the UE's hardware.

Figure 3:
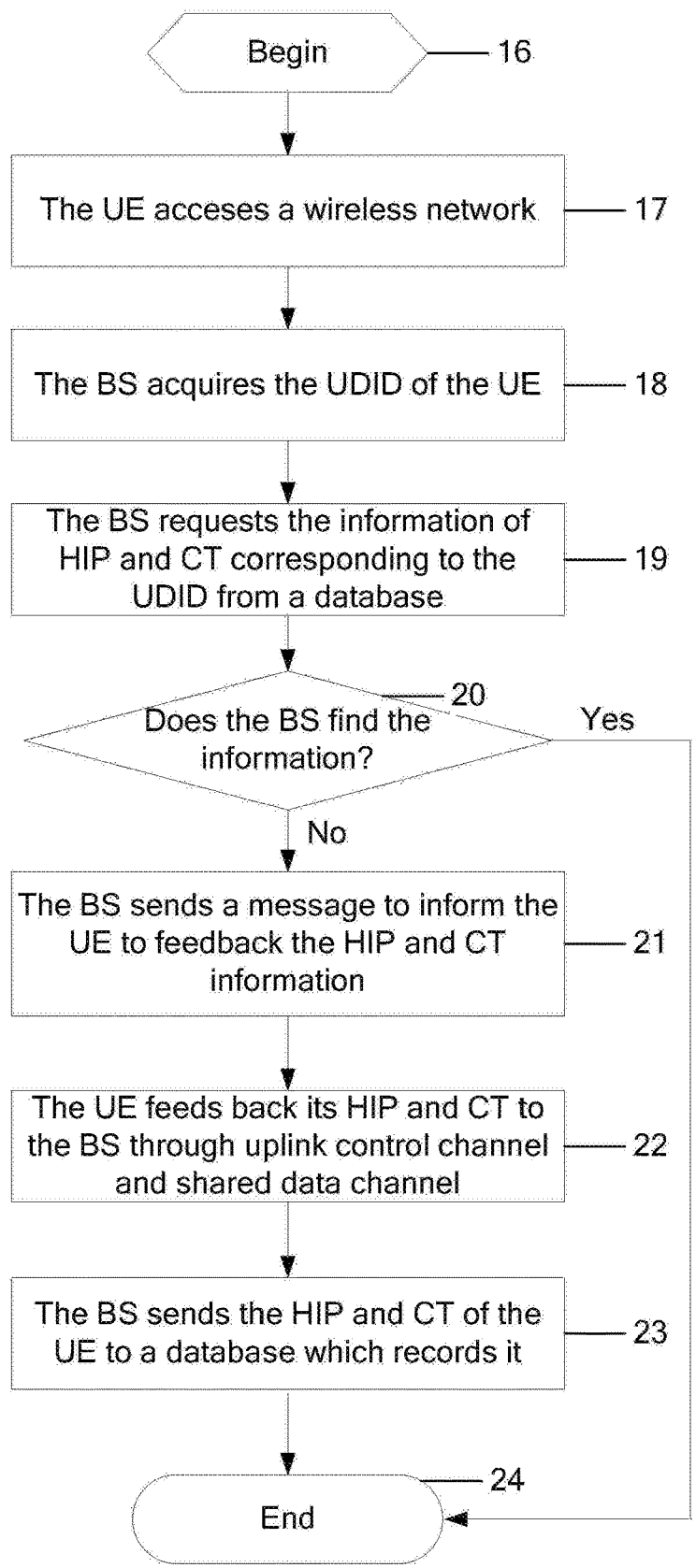
FIG. 3 is an illustration of the process of a BS obtaining the Hardware Impairment Parameters (HIP) and the Current Temperatures (CT) of a UE.

Hardware impairment is a limiting factor in MU-MIMO. In one embodiment, the BS uses information about the circuits in the BS and/or the UEs, such as the information included in the HIP of a UE and the CT at which the UE is operating, to modify the precoding to compensate for the effects caused by imperfections and nonlinearities in the hardware. The HIP of an UE may include parameters that capture the imperfections and nonlinearities in the hardware of the UE. The HIP may also include these parameters under different operating temperatures. The HIP of a UE may be characterized at factory or before being sold or given to a user. This can be done using an automated test equipment, which may include a temperature chamber that tests the UE under different temperatures in the operating temperature range to obtain its HIP. The HIP, including its variations under different temperatures, may be stored in a database, or the UE or both. The process of a BS obtaining the HIP and CT of a UE is presented in FIG. 3. The process begins 16 when a UE accesses a wireless network 17, typically for the first time. Then, the service BS acquires the Unique Device Identity (UDID) information of the UE 18. The BS may then use the UDID to request the HIP and CT from a database 19, which may be connected to the backbone network or at a centralized processing node. The database may also be shared by the networks of multiple carriers. The BS checks if the information can be found from the database 20. If the BS succeeds in retrieving the HIP and CT information for the UDID, the process ends 24. The BS may request the UE to periodically send the UE's CT to the BS and the BS uses the CT to determine the proper HIP to use for the UE. If the BS could not retrieve the HIP and CT information for the UDID, it may send a request to inform the UE to feed back its HIP and CT 21. After receiving this request, the UE sends its HIP and CT to its service BS through the uplink control channel or shared data channel 22. The BS may sends the HIP and CT to a database for storage 23 so that in the future, the same UE will no longer be required to send its HIP to a BS in the network or any BS that can access the database. The BS may also store a copy of the HIP locally for faster processing. Furthermore, when handover is needed as a UE moves from the i th BS to the j th BS, the i th BS may send the HIP and CT information to the j th BS through the backbone or some other connection between them. In an embodiment in which multiple BSs share a centralized node for baseband processing the HIP and the CT may be stored or cached at the centralized node, thus accessible to all neighboring BSs and reducing handover overhead. Since the HIP includes characterization of the hardware impairments at different temperatures, a service BS may require or receive the CT from a UE periodically so that it can apply the HIP at the correct CT for the processing to compensate for the hardware impairments.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

What is claimed is:

1. A method for estimating Multi-User Multiple Input Multiple Output (MU-MIMO) channel information comprising: a Base Station (BS) transmitting test or pilot signals to a plural of User Equipment and the UEs feeding back their channel information to the BS, wherein the UEs and the BS operate in an Frequency-Division Duplex (FDD) system; the BS obtaining Single-User Multiple Input Multiple Output (MU-MIM) channel information of the plural of UEs; the BS estimating the MU-MIMO channel information for the plural of UEs using the SU-MIMO channel information, and calculating an error in the channel information estimates other than that caused by quantization error as a function of the distance between two different vectors in a codebook set; and after estimate of the MU-MIMO channel information and the error in the channel information estimates are obtained, the BS choosing a modulation and channel coding appropriate for the quality of the MU-MIMO channels and the error in the channel information estimates.

2. The method in claim 1 further comprising the BS choosing a precoding that increases the sum capacity of the plural of UEs.

3. The method in claim 1 further comprising UEs transmitting test or pilot signals to the BS and the BS obtaining estimate of the downlink channel information using the uplink test or pilot signals in the case of reciprocal channels.

4. The method in claim 1, further comprising each UE calculating its correlation coefficient and feeding it back to the BS through a uplink control channel or shared data transmission channel.

5. The method in claim 1, wherein the two different vectors do not have a Hermitian interrelationship.

* * * * *